(12) United States Patent
Evans et al.

(10) Patent No.: US 9,133,280 B2
(45) Date of Patent: Sep. 15, 2015

(54) SULFUR-CONTAINING ORGANIC-INORGANIC HYBRID GEL COMPOSITIONS AND AEROGELS

(75) Inventors: Owen R Evans, Chelmsford, MA (US); Wenting Dong, Marlborough, MA (US); Kiranmayi Deshpande, Marlborough, MA (US)

(73) Assignee: ASPEN AEROGELS, INC., Northborough, MA (US)

( * ) Notice: Subject to any disclaimer, the term of this patent is extended or adjusted under 35 U.S.C. 154(b) by 0 days.

(21) Appl. No.: 13/399,871

(22) Filed: Feb. 17, 2012

(65) Prior Publication Data

US 2013/0005842 A1    Jan. 3, 2013

Related U.S. Application Data

(60) Provisional application No. 61/503,389, filed on Jun. 30, 2011.

(51) Int. Cl.
| | | |
|---|---|---|
| *C08C 19/25* | (2006.01) | |
| *B01J 13/00* | (2006.01) | |
| *C08K 7/02* | (2006.01) | |

(52) U.S. Cl.
CPC ............. *C08C 19/25* (2013.01); *B01J 13/0065* (2013.01); *B01J 13/0091* (2013.01); *C08K 7/02* (2013.01)

(58) Field of Classification Search
CPC ... B01J 13/0065; B01J 13/0091; C08C 19/25; C08K 7/02
USPC .......... 521/89, 122, 154; 525/333.9; 423/335, 423/338; 516/99, 111
See application file for complete search history.

(56) References Cited

U.S. PATENT DOCUMENTS

| | | | |
|---|---|---|---|
| 2,174,770 A | 10/1939 | Wilson | |
| 2,188,007 A | 1/1940 | Kistler | |
| 2,803,617 A | 8/1957 | Myron | |
| 3,024,146 A | 3/1962 | Oliver | |
| 3,346,507 A | 10/1967 | Taulli | |
| 4,363,738 A | 12/1982 | Kummermehr | |
| 4,447,345 A | 5/1984 | Kummermehr et al. | |
| 4,619,908 A | 10/1986 | Cheng et al. | |
| 4,667,417 A | 5/1987 | Graser et al. | |
| 4,717,708 A | 1/1988 | Cheng et al. | |
| 4,954,327 A * | 9/1990 | Blount .......................... 423/338 | |
| 5,275,796 A | 1/1994 | Tillotson et al. | |
| 5,306,555 A | 4/1994 | Ramamurthi et al. | |
| 5,565,142 A | 10/1996 | Deshpande et al. | |
| 5,786,059 A | 7/1998 | Frank et al. | |
| 5,789,075 A | 8/1998 | Frank et al. | |
| 5,830,387 A | 11/1998 | Yokogawa et al. | |
| 5,866,027 A | 2/1999 | Frank et al. | |

(Continued)

*Primary Examiner* — Melissa Rioja
(74) *Attorney, Agent, or Firm* — Mark Hanson; Poongunran Muthukumaran

(57) ABSTRACT

Methods and materials are described for preparing organic-inorganic hybrid gel compositions where a sulfur-containing cross-linking agent covalently links the organic and inorganic components. The gel compositions are further dried to provide porous gel compositions and aerogels. The mechanical and thermal properties of the dried gel compositions are also disclosed.

11 Claims, 28 Drawing Sheets

(56) References Cited

U.S. PATENT DOCUMENTS

| | | | |
|---|---|---|---|
| 5,962,539 | A | 10/1999 | Perrut et al. |
| 5,972,254 | A | 10/1999 | Sander |
| 5,973,015 | A | 10/1999 | Coronado et al. |
| 6,068,882 | A | 5/2000 | Ryu |
| 6,080,475 | A | 6/2000 | Frank et al. |
| 6,083,619 | A | 7/2000 | Frank et al. |
| 6,087,407 | A | 7/2000 | Coronado et al. |
| 6,140,377 | A | 10/2000 | Schwertfeger et al. |
| 6,187,250 | B1 | 2/2001 | Champagne |
| 6,197,270 | B1 | 3/2001 | Sonoda et al. |
| 6,271,292 | B1 * | 8/2001 | Mager et al. ............... 524/261 |
| 6,479,416 | B1 | 11/2002 | Frank et al. |
| 6,620,355 | B1 | 9/2003 | Schmidt |
| 6,656,527 | B1 | 12/2003 | Gessner et al. |
| 6,670,402 | B1 | 12/2003 | Lee et al. |
| 6,770,584 | B2 | 8/2004 | Barney et al. |
| 6,887,563 | B2 | 5/2005 | Frank et al. |
| 6,989,123 | B2 | 1/2006 | Lee et al. |
| 7,078,359 | B2 | 7/2006 | Stepanian et al. |
| 7,399,439 | B2 | 7/2008 | Lee et al. |
| 7,504,346 | B2 | 3/2009 | Stepanian et al. |
| 7,780,890 | B2 | 8/2010 | Lee et al. |
| 8,214,980 | B2 | 7/2012 | Bullock et al. |
| 2003/0216489 | A1 * | 11/2003 | Wang et al. ............... 523/216 |
| 2004/0077738 | A1 * | 4/2004 | Field et al. ............... 521/50 |
| 2006/0281825 | A1 * | 12/2006 | Lee et al. ............... 521/50 |
| 2007/0122333 | A1 * | 5/2007 | Yang ............... 423/335 |
| 2007/0152363 | A1 | 7/2007 | Begag et al. |
| 2007/0222116 | A1 * | 9/2007 | Gould et al. ............... 264/321 |
| 2008/0188575 | A1 * | 8/2008 | Gaspar Martinho et al. . 516/111 |
| 2012/0097907 | A1 | 4/2012 | Bauer et al. |

* cited by examiner

Poly bd R-45HTLO

Bis-[3-(triethoxysilyl)propyl]tetrasulfide

SULFUR-CONTAINING ORGANIC-INORGANIC HYBRID GEL COMPOSITIONS AND AEROGELS

CROSS-REFERENCES TO RELATED APPLICATIONS

This application claims the benefit of U.S. Provisional Application Ser. No. 61/503,389, filed Jun. 30, 2011—under 35 U.S.C. §119 which application is incorporated by reference herein in its entirety.

GOVERNMENT INTEREST

This invention was made with the United States Government support under Contract no. NNX08CB59P awarded by NASA. The Government has certain rights in the invention.

Aerogels describe a class of material based upon their structure, namely low density, open cell structures, large surface areas (often 900 $m^2/g$ or higher) and sub-nanometer scale pore sizes. Supercritical and subcritical fluid extraction technologies are commonly used to extract the fluid from the fragile cells of the material. A variety of different aerogel compositions are known and they may be inorganic, organic and inorganic/organic hybrid (see N. Hüsing and U Schubert, Angew. Chem. Int. Ed. 1998, 37, 22-45). Inorganic aerogels are generally based upon metal alkoxides and include materials such as silica, carbides, and alumina. Organic aerogels include, but are not limited to, urethane aerogels, resorcinol formaldehyde aerogels, and polyimide aerogels. Organic/inorganic hybrid aerogels were mainly organically modified silicate materials. The organic components are covalently bonded to the silica network. In other words, the organic and inorganic phases are chemically bonded to each other in the inorganic/organic hybrid aerogels. The present invention involves such covalently bonded inorganic/organic hybrid aerogels.

Aerogel materials of the present invention with densities 0.01-0.5 g/cc are the best solid thermal insulators, better than the best rigid foams with thermal conductivities of 10 mW/m-K and below at 100° F. and atmospheric pressure. Aerogels of the present invention function as thermal insulators primarily by minimizing conduction (low density, tortuous path for heat transfer through the solid nanostructure), convection (very small pore sizes minimize convection), and radiation (IR absorbing or scattering dopants are readily dispersed throughout the aerogel matrix). Depending on the formulation, they can function well at cryogenic temperatures to 550° C. and above. Aerogel materials of the present invention also display many other interesting acoustic, optical, mechanical, and chemical properties that make them abundantly useful. The methods described in this invention represent advances in gel formations that will facilitate production and improved properties of these aerogel materials.

Aerogels of the present invention are formed from flexible gel precursors. Various flexible layers, including flexible fiber-reinforced aerogels, are readily combined and shaped to give pre-forms that when mechanically compressed along one or more axes, give compressively strong bodies along any of those axes. Aerogel bodies that are compressed in this manner exhibit much better thermal insulation values than incumbent insulation materials.

Methods for gel monolith and/or fiber-reinforced composite gel production formed via sol-gel chemistry involve batch casting. Batch casting is defined herein as catalyzing one entire volume of sol to induce gelation simultaneously throughout that volume. Gel-forming techniques are well-known to those trained in the art: examples include adjusting the pH and/or temperature of a dilute metal oxide sol to a point where gelation occurs (R. K. Iler, Colloid Chemistry of Silica and Silicates, 1954, chapter 6; R. K. Iler, The Chemistry of Silica, 1979, chapter 5, C. J. Brinker and G. W. Scherer, Sol-Gel Science, 1990, chapters 2 and 3). Suitable materials for forming inorganic aerogels are oxides of most of the metals that can form oxides, such as silicon, aluminum, titanium, zirconium, hafnium, yttrium, vanadium, and the like. Particularly preferred are gels formed primarily from alcohol solutions of hydrolyzed silicate esters due to their ready availability and low cost (alcogel).

The sol-gel process is used to synthesize a large variety of inorganic and hybrid inorganic-organic xerogels, aerogels and nanocomposite materials. Relevant precursor materials for silica based aerogel synthesis include, but are not limited to, sodium silicates, tetraethylorthosilicate (TEOS), tetramethylorthosilicate (TMOS), monomeric alkylalkoxy silanes, bis trialkoxy alkyl or aryl silanes, polyhedral silsesquioxanes, and others. Various polymers have been incorporated into silica gels to improve mechanical properties of the resulting gels, xerogels (see J. D. Mackenzie, Y. J. Chung and Y. Hu, J. Non-Crystalline solid 147&148 (1992), 271-279; and Y. Hu and J. D. Mackenzie. J. Mater. Science, 27, (1992)), and aerogels (see S. J. Kramer, F. Rubio-Alonso and J. D. Mackenzie, MRS Proc. Vol 435, 295-300, 1996). Aerogels are typically obtained when the gels are dried in a manner that does not alter or causes minimal changes to the structure of the wet gel. This is typically accomplished by removing the solvent phase from the gel above the critical point of the solvent or mixture of solvents if a co-solvent is used to aid the drying process. However, the surface of the wet-gels of the present invention may be treated with silylating agents such as Hexamethylsilazane or other chemicals such that they are made strong enough to withstand any collapsing forces during drying conducted below the critical point and even at ambient pressures and at ambient or elevated temperatures.

Covalently bonded hybrid aerogel materials are produced by using various cross linking agents as bridges between the inorganic and organic components. However, the choice of the cross linking agent influences the properties of the resulting materials considerably. The present invention employs sulfur based cross linking agents and in particular, sulfidosilanes and/or tetra and hexasulfides, to bridge the organic-inorganic components. Polybutadiene as the unsaturated organic polymer and bis(triethoxysilylpropyl)tetrasulfide (TESPT) as the sulfur containing cross linking agent are used as examples to illustrate the capabilities of the present invention. However, many other similar materials described here and elsewhere may be substituted for the unsaturated organic polymer and the sulfur containing cross linking agent to practice the present invention.

Illustrative examples of unsaturated organic polymers useful in the present invention include, but not limited to, unsaturated polyesters, prepolymers based on vinylesters, acrylates, methacrylates or polyurethanes, polybutadiene, polystyrene, polyisoprene, co-polymers such as styrene-butadiene copolymer, butadiene-isoprene co-polymer, buradiene, -isoprene-styrene ter polymer, copolymer-terpolymer of isobutylene, para-methylstyrene and bromo-para-methylstyrene, EPDM rubber, or any combination of the foregoing.

Illustrative examples of sulfur-containing cross linking agents useful in the present invention include, but not limited to, polysulfide alkyl silanes, mercapto aryl silanes, polysulfide aryl silanes such as those described in German Pat. Nos. 1,000,817 and 2,141,159 and U.S. Pat. No. 2,719,165 and U.S. Pat. No. 4,044,037, silated core polysulfides described in U.S. Pat. No. 7,696,269 and U.S. Pat. No. 7,687,558, silated cyclic core polysulfides, including those described in U.S. Pat. No. 7,968,634, U.S. Pat. No. 7,968,636, sulfur-containing silanes described in U.S. Pat. No. 7,786,200 and U.S. Pat. No. 6,518,335, Sulfanylsilanes described in U.S. Pat. No. 6,229,036, sulfur-containing siloxanes, Sulfur-functional polyorganosiloxanes such as those described in U.S. Pat. No. 6,472,481, bis(triethoxysilylpropyl)tetrasulfide (TESPT), 3-thiocyanatopropyltriethoxysilane, 3-mercaptopropyltrimethoxysilane or any combination of the foregoing.

Additionally, fiber reinforcements may be added to the gels to produce a wet gel sheet that may be subsequently dried to produce aerogel composites. Fiber reinforcements may be in the form of discrete fibers or non-woven structures like battings, matts, felts of one or more organic or inorganic fibrous materials. When non-woven structures are used, it is preferable to use them in a continuous sheet to produce a continuous gel sheet of fiber reinforced hybrid gels of the present invention. Such sheets may be rolled and dried, preferably such that they substantially retain an open pore structure.

The loading of each component such as the organic polymer, cross-linking agents, inorganic materials such as silica may be varied to change the properties of the resulting composites. When fiber reinforcement is preferred, the amount of fiber is also available as a variable to control various properties, including mechanical strength, flexibility, thermal conductivity, opacity, transparence, etc. Organic polymer may be added up to 80 wt % and preferably up to 50 wt % and more preferably up to 30 wt % of the overall weight of the gel composition. The cross linking agents may be added up to 30 wt %, preferably up to 15 wt % and more preferably up to 5 wt % of the gel composition.

The gel compositions of the present invention may be prepared by three major steps. First would be to prepare a silane-functionalized organic polymer. This step may be performed in aqueous medium or in a non-aqueous medium. The second step would be to react the functionalized organic polymer with an inorganic gel precursor, typically a silica precursor, but it may be of any metal oxide type. In the case of silica, it may be a hydrolyzed alkoxy silane or a sol prepared from water glass (sodium silicate). As such, the functionalized organic polymer is reacted with the inorganic sol and allowed to gel. This sol-gel process may be controlled using all the variables typically available in a sol-gel process as understood in the art. Before it is gelled, additional ingredients like opacifiers or reinforcement fibers may be added. Third major step would be to dry the gel to prepare a porous body. Drying may be accomplished through a ambient pressure drying or a high-pressure or alternatively a drying involving a supercritical fluid.

Increased incorporation of latex modifiers or any organic elastomer for that matter, within a silica aerogel matrix will likely be promoted by derivitization with a reactive silane coupling agent. Such a strategy has been used extensively by the tire industry to improve the incorporation and adhesion of silica/alumina modifiers within a synthetic rubber matrix, a process known to vastly improve the mechanical durability and abrasion resistance of these materials. Sulfur-based silane coupling agents, such as bis(triethoxysilylpropyl)tetrasulfide (TESPT) or mercaptopropyl-trimethoxysilane (MPTS), are typically used in this process. At elevated temperatures, the sulfur-based moieties in these coupling reagents are known to react with the unsaturated sites of a synthetic or natural rubber (i.e. polyisoprene), a crosslinking process known as vulcanization (FIG. 1). This vulcanization process has been shown to improve the overall durability and elasticity of a rubber-based material, attributes that are desirable for a material intended for use in an inflatable habitat.

A simplified schematic showing our approach is shown in FIG. 2. The approach basically consisted of a two-step process: (1) modification of poly(styrene-butadiene) latex with sulfidosilane coupling agents followed by (2) co-hydrolysis and condensation with silica precursors (TEOS, polyethylsilicate, etc). The use of modified latex emulsions in this fashion should allow for a significant increase in organic loadings without sacrificing mechanical or thermal performance. This is in stark contrast to the materials prepared with unmodified polymeric emulsions which could only be prepared at a maximum organic content of 30 wt %. The use of more reactive polymeric modifiers was expected to afford aerogel-based insulation materials with a significant elastic modulus, sufficient radiation protection and superior thermal protection.

Vulcanization of Styrene-Butadiene Latex Aqueous Emulsions—Preparation of Silane Functionalized Polymers. Shown in Table 1 are the conditions and formulations used to prepare vulcanized/modified latex particles. In general, ethanol solutions of sulfidosilane coupling agents were added to aqueous solutions of latex, activator and metal oxide. Activators used for this vulcanization process were proprietary fatty-acid zinc salts (73 LM and ZB 47) available from Struktol Corporation. The use of these soluble zinc salts have been specifically shown to rapidly increase the cure kinetics during sulfur vulcanization processes. The specific latex used in all formulations was UCAR DL313, a SBR (styrene-butadiene rubber) emulsion with an average particle size of 0.1 μm available from Dow Chemical. Dilute mixtures of latex, activator and metal oxide were refluxed for a specified period of time to affect vulcanization. The kinetics and reactivity of each vulcanization process was closely monitored by FT-IR spectroscopy and particle size analysis.

TABLE 1

Conditions and formulations used to prepare vulcanized latex mixtures.

| | Coupling Agent | | | Latex | | | Activator | | Metal Oxide | |
|---|---|---|---|---|---|---|---|---|---|---|
| Sample ID | Identity | Weight % | EtOH Add | Identity | Weight % | H2O Add | Identity | Weight % | Identity | Weight % |
| TV-1 | TESPT | 35 | 5x Dilution | UCAR DL313 | 65 | 4x Dilution | 73 LM & ZB 47 | 1 | nano-ZnO$_2$ | 0.5 |
| TV-2 | TESPT | 35 | none | UCAR DL313 | 65 | none | 73 LM | 5 | nano-ZnO$_2$ | 5 |
| Me-1 | MPTS | 35 | 3x Dilution | UCAR DL313 | 65 | 3x Dilution | none | n/a | none | n/a |

The change in particle size distribution for latex emulsions treated with either MPTS or TESPT coupling agents was assessed using a LA910 particle size analyzer (FIG. 3). Untreated UCAR 313 latex emulsions exhibited a sharp distribution with 90% of the particles possessing an average diameter of 0.1840 μm. Treatment of this latex emulsion with a dilute solution of TESPT caused the diameter of the particles to increase slightly (0.2237 μm). Treatment with MPTS under dilute conditions afforded similar results, i.e. slight increase in average diameter. However, treatment with TESPT at higher concentrations yielded much larger particles with a significantly wider distribution. Here 50% of the particles were found to be in the diameter range 106.05 μm and 90% in the 405.91 μm diameter range. The increase in particle size for all treatments was indicative of a vulcanization process in which appreciable inter-particle crosslinking occurs. These results suggest that this coagulation phenomenon was highly dependent on reaction concentration and can be avoided by performing the vulcanization process under dilute conditions.

Fourier Transform Infrared Spectroscopy. The vulcanization process of SBR latex emulsions was closely monitored via FT-IR spectroscopy. Shown in FIG. 4 are the FT-IR spectra of neat MPTS and the Me-1 latex emulsion before and after vulcanization. Evident in the spectra for both MPTS and Me-1 prior to vulcanization is a weak band centered at 2560 $cm^{-1}$. This band is attributed to the presence of S—H groups and is noticeably absent in the spectra for Me-1 after vulcanization [$^t$]. The IR spectrum for the vulcanized latex instead, exhibited a strong C—S stretch centered at 700 $cm^{-1}$. The appearance of this peak and the lack of any peaks attributable to S—H was suggestive of a near complete vulcanization process involving the addition of sulfur across unsaturated sites in the latex emulsion. Coupled with the increase in average particle size observed upon vulcanization, one may assume that the latex particles effectively contain sufficient trialkoxysliane species to participate in sol-gel hydrolysis/condensation reactions. The use of these emulsions will thus likely result in the formation of a hybrid aerogel material possessing the mechanical properties of an elastomeric rubber compound.

Shown in FIG. 5 are the spectra of neat MPST in comparison to two styrene-butadiene latex emulsions vulcanized in the presence of MPST. The efficacy of vulcanization is clearly demonstrated by an increase in the intensity of the S—C stretch centered at 700 $cm^{-1}$. Absent in the spectra is a broad peak centered at 1050 $cm^{-1}$, typically attributed to Si—O—Si stretching modes. Instead, well defined peaks centered at higher wavenumbers are observed (1165, 1100 and 1073 $cm^{-1}$) which can be attributed to the presence of Si—OEt groups. This observation suggests that the conditions used for vulcanization do not result in premature hydrolysis (and condensation) of the Si—OEt species and results in a latex emulsion with a well-defined and meta-stable surface chemistry. This will thus allow for the effective use of this latex emulsion in sol-gel reactions by providing a means to precisely control the kinetics and rate of hydrolysis of this precursor during aerogel preparation.

Preparation of Vulcanized Latex/Aerogel Composites. Shown in Table 2 are the identities and composition of aerogel composites prepared with vulcanized SBR emulsions. A range of latex loadings from 10 to 50 wt % were prepared, characterized and compared to a control sample prepared with an untreated latex emulsion. The required amount of latex emulsion was added to a previously hydrolyzed solution of tetraethylorthosilicate. After stirring for a minimum of two hours, the resulting mixture was combined with a small amount of ethanolic ammonium hydroxide to affect condensation and the formation of a rigid, coherent wet gel. The wet gel was aged overnight at 60° C. in a solution of ammonium hydroxide in ethanol (1 vol %). After aging, solvents were removed using standard supercritical $CO_2$ extraction procedures to afford highly flexible aerogel composites.

TABLE 2

Composition and identity of aerogel samples prepared with vulcanized SBR emulsions.

| Sample ID | Latex | Target Density (g/cc) | Latex Weight % | Silica Weight % |
|---|---|---|---|---|
| Control | Untreated UCAR 313 | 0.065 | 10 | 90 |
| 10% Me-1 | Me-1 | | 10 | 90 |
| 10% TV-1 | TV-1 | | 10 | 90 |
| 30% TV-2 | TV-2 | | 30 | 90 |
| 50% TV-2 | TV-2 | | 50 | 50 |

Thermal Conductivity and Density Evaluation. Shown in Table are the measured density and thermal conductivity values for hybrid aerogels prepared using vulcanized SBR emulsions. With the exception of aerogels prepared from TV-2, the measured thermal conductivities and densities are essentially identical to the control sample. Remarkably, aerogels composed of 50 wt % styrene-butadiene have nearly identical thermal conductivities to the control sample. It is important to note that this level of organic incorporation is not possible without prior derivitization/functionalization with the sulfidosilane coupling agents. Samples with an elevated organic content exhibited a lower final density (0.1 g/cc), which suggests that the degree of process shrinkage and gel syneresis is considerably reduced for these materials relative to standard silicate aerogels. Qualitatively, these samples exhibited a reduced dust load relative to all control samples.

TABLE 3

Density and thermal conductivity values of hybrid silica aerogels prepared using vulcanized SBR emulsions.

| Sample ID | Final Density (g/cc) | Thermal Conductivity (mW/mK) |
|---|---|---|
| Control | 0.123 | 13.1 |
| 10% Me-1 | 0.124 | 12.7 |
| 10% TV-1 | 0.138 | 13.0 |
| 30% TV-2 | 0.123 | n/a |
| 50% TV-2 | 0.100 | 13.8 |

Fourier-Transform Infrared Spectroscopy. Shown in FIG. 7 are the FT-IR spectra of two hybrid aerogels doped with 10 wt % TV-1 emulsion (blue) and 50 wt % TV-2 emulsion (red). Present in both spectra are peaks centered at ~2900 $cm^{-1}$ attributable to the presence of aliphatic C—H groups, resulting from the effective incorporation of styrene-butadiene elastomers into the silicate network. At a nominal loading of 50% latex, the intensity of these peaks increases significantly, suggesting that the organic content for these materials is significant. The spectra also exhibit a weak to moderate peak centered at 700 $cm^{-1}$, which is attributable to the presence of S—C bonds. The observation of these peaks suggests that the vulcanization process has occurred and that effective coupling of the sulfidosilanes to the SBR emulsion has been obtained.

Thermal Gravimetric Analysis (TGA) and Differential Scanning calorimetry (DSC). Shown in FIG. 8 and FIG. 9 are the TGA and DSC curves for latex/rubber aerogel composites prepared from the vulcanizates prepared via the reaction of a styrene-butadiene emulsion (UCAR DL313) with Bis-[3-(triethoxysilyl) propyl]tetrasulfide (referred here as TESPT or as TV-1 in sample ID) and mercaptopropyltriethoxysilane (Me-1 as sample ID). Also included in the analysis is a latex/aerogel composite prepared without prior vulcanization. Because all materials contain the same nominal organic content (10%), they exhibit nearly identical weight losses from ambient to 500° C. However, evidence of vulcanization and increased crosslink density for TV-1 and Me-1 samples is observed in the DSC trace from 220 to 280° C. At this temperature range, all of the composites exhibit a mild exothermic transition with complete weight retention. This transition is attributed to the thermally induced crosslinking of the SBR latex, with oxidation and decomposition occurring at a higher temperature of 310° C. In comparison to the TEOS/latex control sample, the vulcanized materials do not exhibit a smooth and rapid exothermic transition. Instead, the transition is broad and ill-defined. This is evidence of prior crosslinking and demonstrates the successful vulcanization and functionalization of the SBR emulsion prior to sol-gel synthesis. It is important to note that this TGA/DSC analysis indicates that these rubber/aerogel materials are stable well above the maximum observed temperature at the lunar surface (~120° C.).

Porosimetry Evaluation. Shown in FIG. 10 are the nitrogen physisorption isotherms for vulcanized latex/aerogel composites. As evidenced by the rapid adsorption at high pressures and the formation of a Type IV isotherm, all of the solids possess a large population of interconnected mesopores (2-50 nm). This behavior is consistent with the formation of a high-surface-area aerogel material. Calculated surface areas and pore size distributions obtained from the analysis of the $N_2$ physisorption isotherms confirms this assertion (Table 4).

TABLE 4

Surface areas, pore volume and mean pore diameter calculated for vulcanized latex/aerogel composites.

| Sample ID | Surface Area ($m^2/g$) | Pore Volume ($cm^3/g$) | Pore Diameter (nm) |
|---|---|---|---|
| TEOS | 973 | 3.26 | 9.41 |
| TEOS-L | 966 | 4.08 | 11.87 |
| 10% Me-1 | 1011 | 3.94 | 11.02 |
| 10% TV-1 | 876 | 3.66 | 11.84 |

Mechanical Property Evaluation—Compressive Recovery. It is expected that the packaging and deployment of an inflatable habitat will subject materials to moderate compressive and tensile stresses. It is thus vitally important to assess the impacts of mechanical stress on the overall material properties of the hybrid aerogel composites developed during this program. The results of repeated flexure and repeated compressive events on material thermophysical properties of prototype aerogel material are described below. Additionally, the stress-strain curves of some prototype composites and determined compressive moduli are also described below.

Compressive Strength Evaluation. The compressive properties of hybrid aerogels prepared with various amounts of emulsified elastomer were determined using an Instron model 5569, a 50 kN load cell and a crosshead speed of 0.06 in/min. The Young's moduli for candidate aerogels were determined by calculating the slope in the elastic region of the stress-strain curve. Shown in Table 5 are the calculated compressive moduli and the observed change in thermal performance upon compression for hybrid aerogels containing various amounts of vulcanized and untreated UCAR 313 latex. A slight change in compressive strength was observed for materials prepared with vulcanized latex emulsions, presumably due to an increase in crosslink density that occurs upon vulcanization for the styrene-butadiene elastomer (FIG. 12). While the effect is subtle, it is expected that an optimization of the vulcanization process should afford aerogels with an improved compressive strength.

TABLE 5

Young's modulus and effects of compression on the thermal performance of hybrid aerogel formulations.

| Sample ID | Latex | Final Density (g/cc) | Thermal Conductivity (mW/mK) | Young's Modulus (PSI) | Thermal Conductivity After Compression (mW/mK) |
|---|---|---|---|---|---|
| Control | Untreated UCAR 313 | 0.123 | 13.1 | 30 | 14.1 |
| 10% Me-1 | Me-1 | 0.124 | 12.7 | 36 | 15.9 |
| 10% TV-1 | TV-1 | 0.138 | 13.0 | 42 | 14.2 |

Assessment of Compressive Elasticity (Recovery). The compressive elasticity of hybrid aerogels prepared with various amounts of emulsified elastomer was determined using an Instron model 5569, a 50 kN load cell and a crosshead speed of 0.01 in/min. After preloading to a pressure of 0.004 PSI, 2 in×2 in samples were compressed to a total load of 14 PSI. The compressive recovery was assessed by determining the change in thickness immediately after and 5 minutes after the compressive load. The latter point was acquired after observing that many samples do not exhibit an immediate recovery. The compressive recovery for a number of hybrid aerogel samples prepared with vulcanized styrene-butadiene emulsions are shown in Figure. As evidenced by the data, increases in organic content unfortunately have a detrimental effect on compressive elasticity. Specifically, aerogels containing a nominal organic content of 50% exhibited a 5 min recovery of 78% versus 97% for a pure silica control sample.

Despite the fact that the inferior compressive elasticity observed for the high organic content materials are presumably resulting from the collapse of a finite population of macropores, it is still likely that the silicate backbone is sufficiently robust to retain microporosity. Impacts to thickness and density are however, expected to be fairly moderate. Shown in FIG. 14 are the changes in thermal conductivity and density for hybrid aerogel composites after three successive compressive loads to 14.7 PSI. It is important to note that a large number of the hybrid aerogels exhibit changes in thermal conductivity equal to or better than that observed for the silica-based control sample. Consistent with the previously described inferior compressive recovery results, samples with an appreciable amount of organic content exhibit a densification of nearly 50%.

FUNCTIONALIZING IN NON-POLAR SOLVENTS AND PREPARING GEL COMPOSITION

Functionalizing unsaturated organic polymers such as polyolefins with sulfidosilanes is highly attractive in that it can be conducted in aqueous systems using suitable latex emulsions. In one embodiment, sulfur-functionalization of the unsaturated organic polymers are performed in aqueous medium. Alternatively, they may be conducted on non-aqueous medium. In some instances, aqueous vulcanization processes may be sluggish, leading to material heterogeneity via coagulation and can initiate premature hydrolysis of alkoxysilane moieties. In another embodiment, the present invention employs a non-aqueous vulcanization process to affect derivitization of polybutadiene.

The vulcanization process is used to transform natural or synthetic polyolefin into a thermoset resin with the main goal of improving durability, thermostability, elasticity and tensile strength (FIG. 15). Activator loading, reaction concentration, reaction time and reaction temperature are important for vulcanization process. As such, the effects of, (1) activator concentration, (2) reactant concentration and (3) sulfidosilane coupling agent concentration on the molecular weight and reactivity of the vulcanizate formed from the reaction of polybutadiene w/TESPT may be used to alter or engineer the reactivity and molecular weight of the vulcanizate that affect the final properties of the resulting aerogel composite.

The derivitization/vulcanization process used in an embodiment involves the reaction of polybutadiene and TESPT coupling agent (structure shown in FIG. 16) in refluxing non-polar solvents (toluene, dioxane, etc.) for a period of 6 hours. Reactant concentrations, coupling agent concentrations and activator contents were varied according to the data provided in Table. The specific activator used was 73-LM, a proprietary mixture of fatty acid zinc salts produced by Struktol Corporation to specifically promote low temperature vulcanization processes. After refluxing, the product mixtures were characterized via infrared spectroscopy and gel permeation chromatography to assess reactivity and polymer molecular weight.

FIG. 17 illustrates the Fourier Transform infrared (FT-IR) spectrum of WD-32 vulcanizate in comparison to pure polybutadiene. Absent in the spectra is a broad peak centered at 1050 cm$^{-1}$, typically attributed to Si—O—Si stretching modes. Instead, well defined peaks centered at higher wave numbers are observed (1165, 1100 and 1073 cm$^{-1}$) which can be attributed to the presence of Si—OEt groups. This observation suggests that the conditions used for vulcanization do not result in premature hydrolysis (and condensation) of the Si—OEt species, allowing for the possible use of the vulcanizate in standard acid-base sol-gel reactions. Present in the spectra for polybutadiene is a weak band centered at 1637 cm$^{-1}$. This peak is attributable to the presence of olefinic (C=C) species. The decrease in the relative intensity (-50%) of this peak upon vulcanization is evidence of carbon-sulfur bond formation and the formation of a crosslinked polymer possessing reactive trialkoxysilane moieties. The appearance of a peak at ~700 cm$^{-1}$ is evidence of carbon-to-sulfur (monosulfide and/or disulfide) bond formation.

TABLE 6

Vulcanization conditions used to optimize the derivitization process of polybutadiene with TESPT.

| ID | C = C/TESPT Mole Ratio | Reactant Concentration (g/mL) | Activator Mixture | Activator Content (%) | Purpose |
|---|---|---|---|---|---|
| WD-32 | 6.9 | 0.65 | 73-LM & ZnO | 5 | Effects of Coupling Agent Concentration |
| WD-30 | 12.6 | 0.65 | 73-LM & ZnO | 5 | |
| WD-28 | 18.8 | 0.65 | 73-LM & ZnO | 5 | |
| WD-31 | 34.4 | 0.65 | 73-LM & ZnO | 5 | |
| WD-24 | 18.8 | 1 | 73-LM & ZnO | 5 | Effects of Reactant Concentration |
| WD-25 | 18.8 | 0.5 | 73-LM & ZnO | 5 | |
| WD-26 | 18.8 | 0.65 | 73-LM & ZnO | 5 | |
| WD-27 | 18.8 | 0.65 | 73-LM | 5 | Effects of Activator Content |
| WD-28 | 18.8 | 0.65 | 73-LM | 3 | |
| WD-29 | 18.8 | 0.65 | 73-LM | 1 | |

All of the vulcanizates prepared in Table 6 were characterized via gel permeation chromatography (GPC). This analysis is particularly powerful in that it will not only allow one to assess changes in the molecular weight of the vulcanizate, it can be used to approximate product yield by monitoring the disappearance of peaks attributable to TESPT (retention time=11.2 min, $M_w$=600). Shown in FIG. 18 are a series of GPC chromatograms for polybutadiene/TESPT vulcanizates in comparison to pure polybutadiene. Evident in these vulcanizates are low molecular weight species (TESPT), the presence of which indicates a product yield of less than 100%. Given that the nominal loading of TESPT is known prior to each vulcanization reaction, it is possible to calculate the product yield based on the change in relative peak areas for TESPT and PBD obtained from GPC analysis. Shown in Figure are the peak molecular weights and product yields as determined by GPC analysis for a number of vulcanization reactions performed. The molecular weight of the vulcanizate of the invention is directly proportional to both coupling agent concentration and activator content. Clearly, increases in both result in an appreciable increase in crosslink density and a higher molecular weight vulcanizate. This increase in crosslink density will likely have an appreciable effect on the elasticity, durability and mechanical properties of a hybrid aerogel prepared with these particular vulcanizates. Product yields for this vulcanization process seem to be mostly favored by low activator content and high coupling agent concentrations.

Preparation of Hybrid Gels—

This process is a co-condensation of vulcanized Polybutadiene (PBD)-Si(OEt)$_3$ and silica from TEOS. As vulcanized PBD-Si(OEt)$_3$ cannot be dissolve in ethanol, dioxane was chosen as the solvent in the condensation reaction, which is a non-alcoholic sol-gel process. Additionally, a fiber reinforcement may be added to the gels to produce a wet gel sheet that may be subsequently dried to produce aerogel composites. Polyester fiber reinforced aerogel composites were prepared at various vulcanizate loadings ranging from 0 to 50 wt %. All materials were prepared at a low target density of 0.05 g/cc in order to maximize thermal performance when measured at low pressures (i.e. vacuum). Aging was done at RT, overnight and afterwards 1% NH3-6.25% HMDZ in EtOH, at 55° C. for ~30 hrs.

As can be seen from FIG. 20 that even for target density of 0.07 g/cc and final density of ~0.10 g/cc, the aerogel coupons are very flexible even with 17 wt % Polybutadiene—PBD-PESPT doping. For the same target density, the aerogel coupons without PBD-PESPT doping are very rigid and could not bend without aerogel particle shattering.

The relatively short gel times of WD-35F (30 minutes) are remarkable given that these materials contain 50% organic polymer. This level of reactivity clearly indicates that the vulcanization process affords a functionalized polymer that is highly reactive in hydrolysis and condensation reactions. It is also worthwhile to note that these short gel times improve the compatibility of these materials with economically feasible large scale manufacturing processes. A cursory analysis of the as-prepared aerogel composites indicate that flexibility, durability and elasticity of these materials are directly related to the organic content of the composite. The incorporation of a vulcanized rubber component to these aerogel composites is clearly imparting a positive effect on the mechanical properties of these materials.

Thermal Conductivity and Density Evaluation.

Shown in Figure—FIG. 22 are the measured ambient thermal conductivity and density values for rubber/silica aerogel composites prepared with various PBD vulcanizates. The thermal conductivity values for all the final materials are directly proportional to their respective organic content. Without limiting to one particular theory, applicants postulate that the substantial incorporation of polymeric materials likely results in the formation of macropores and a subsequent increase in convective heat transfer. respectively. The data shown in Figure indicate that final densities as low as 0.065 g/cc were achievable with this current approach.

Infrared Spectroscopy.

Shown in Figure is a FT-IR spectra of an aerogel composite prepared with a low molecular weight PBD vulcanizate (WD-23). This material has a nominal organic content of 50 wt %, and displays obvious peaks attributable to the presence of olefinic and methylene groups. While the intensity of these peaks is clearly dominated by the presence of an intense Si—O—Si asymmetric peak at 1060 $cm^{-1}$, these results are clearly suggestive of substantial incorporation of organic content. The FT-IR spectra of other hybrid silica/PBD aerogel composites are essentially identical and clearly show evidence of high levels of organic content.

Surface Area and Porosity Evaluation.

BET surface area of hybrid decreases with increasing PBD content. As shown in FIG. 24 and Table 6, hybrid with 0, 17, 33% PBD are 950-930 m2/g and surface area decreased dramatically to 630 $m^2$/g with 50% PB. This might be the reason for increased TC with increasing PBD content in hybrid aerogel.

TABLE 7

Scaled up experiments WD-35c, d, e, f (same as WD-31) using G80 fiber. Coupon size: 8" × 8". Total H2O/SiO2 molar ratio for TEOS or PBD-PESPT was 4.

| Sample ID | WD-35C | WD-35D | WD-35E | WD-35F |
|---|---|---|---|---|
| PBD-PESPT wt % in total solid | 0 | 17 | 33 | 50 |
| Final density (g/cc) | 0.12 | 0.11 | 0.09 | 0.09 |
| TC (mW/m-K) | 11.6 | 13.3 | 15.5 | 18.2 |
| BET surface area (m2/g) | 946.3 | 945.9 | 932.9 | 631.0 |
| Average desorption pore volume (cm2/g) | 2.84 | 3.20 | 2.92 | 1.90 |
| Average desorption pore diameter (nm) | 8.36 | 10.56 | 10.62 | 10.40 |

Recovery after Compression.

The compressive recovery was determined using an Instron model 5569, a 50 kN load cell and a crosshead speed of 0.05 in/min After preloading to a pressure of 0 psi, 2 in×2 in samples were compressed to a total load of 14.7 psi and then the stress was released to 0 psi. The strain at 0 psi is the final strain of the sample after compression. As shown in FIG. 25, the strain at 0 psi for 33% PBD-PESPT is 1%, which means that the recovery of the sample thickness is 99%. All hybrid aerogels showed recovery above 97%.

Hydrophobicity Evaluation.

While atmospheric degradation of these materials is not expected to be a concern in a lunar environment, they will be subject to various levels of humidity prior to launch and deployment. The hydrophobicity of all rubber/aerogel composites have thus been assessed via water contact angle measurement. Surprisingly, materials with nominal organic loadings approaching 50 wt % exhibit very high water contact angles regardless of aging conditions (hexamethyldisilazane vs. ammonium hydroxide). This level of inherent hydrophobicity is indicative of significant polymer incorporation and is consistent with our infrared spectroscopic evaluation. These results are significant because it suggests that our standard wet-gel aging conditions can be significantly shortened or modified by eliminating the use of a standard hydrophobe agent, hexamethyldisilazane.

Consistent with the previously described inferior compressive recovery results, samples with an appreciable amount of organic content exhibit a densification of nearly 50%. The final materials may be further enhanced by improving the homogeneity of polymer incorporation, reducing the macroporosity of the composites and improving the overall compressive elasticity of high organic content aerogel materials.

Thermal Performance Testing Under Vacuum.

Test Method Description. In order to measure the thermal conductivity of low density materials such as the hybrid aerogels of the present invention, a guarded hot plate apparatus based on a slightly modified ASTM C177-85 design was used. This unit is capable of obtaining thermal conductivity values in the temperature range of −200° F. to 600° F. Examples of materials that have been tested in this apparatus are insulating foams, graphite foams and fibrous insulations, low density ceramic insulations, cloths and rubbers.

This apparatus is capable of operating in a vacuum down to $10^{-5}$ torr ($10^{-6}$ torr if the material is clean). The apparatus consists of a central heater plate surrounded by a guard heater, each separately controlled. The guard ring is maintained at the same temperature as the central heater so that all of the heat flow is normal to the specimen surface. The temperature differences between the guard and the central sections are measured by means of differential thermocouple junctions connected in series. The heater plate is sandwiched between layers of interfacial material, the hot face thermocouples, the specimen, cold face thermocouples, interfacial material, and finally a cold source to dissipate the heat. In addition to the thermocouples in contact with the specimen, thermocouples are located in the central heater and outer copper cold plates. FIG. 27 shows a schematic of a typical hot plate apparatus.

To provide intimate contact at all interfaces, the entire sandwich assembly is pressed firmly together by spring loading with the total load application desired, which is usually 600 pounds. For fragile specimens spacers are used to maintain specimen thickness. Spacers maintain a fixed distance between the heater and the cold plate. For specimens greater than 0.250 in thick internal thermocouples are used. These thermocouples consist of 0.005 in diameter wire in a 0.040 in double bore alumina tube. To obtain mean sample temperatures above room temperature, water is circulated through the cooling section. Equilibrium conditions are obtained before readings are taken.

Thermal conductivity values were calculated from the following expression:

$$k_s = Ql_s/A\Delta t$$

where
Q=total heat flow (Btu/hr)
$l_s$=average thickness of specimen (inches)
A=area of central heater section (ft$^2$)
Δt=sum of temperature drop across sample (° F.).

Theoretically, Q, the heat input, should split, with exactly half of the input flowing through each sample. The temperature drops indicate that this condition rarely exists. Instead, there is a slight unbalance in heat flow. The above formula then permits a calculation of the arithmetic average for the two panels. In this calculation the temperatures are measured directly at the faces of the specimen by the getters, resulting in a direct method.

Thermal Performance Results & Discussion.

A low density hybrid rubber/aerogel composite containing a nominal organic loading of 17 wt % (WD-35D) was subjected to thermal conductivity testing according to the methods discussed above. Specifically, the thermal conductivity at 100° F. was determined at an ambient pressure and under high vacuum (3.5×10$^{-4}$ Torr). All samples were tested at a compressive load of 0.4 PSI, a thickness of 0.25 in and a final density of 0.0764 g/cc. Interestingly, the values observed for these hybrid aerogel composites compare very favorably to those observed for multi-layer insulation. It is particularly well known that MLI-based insulation systems are highly sensitive to compressive events and will thus exhibit variable thermal conductivity values ranging from 1.1 and 5.5 mW/m·K when tested under the same conditions. In contrast, the aerogel-based materials of the present invention are largely insensitive to the compression events associated with the rigors of packing and deployment.

The thermal conductivity of any material under high vacuum results from the combination of radiative and solid conductivity heat transfer. The hybrid aerogels of the present invention were specifically prepared at low densities to minimize the contributions of heat transfer from solid conductivity. The inhibition of radiative heat transfer in these materials is however likely to be minimal due to the transparency of SiO$_2$ to infrared radiation. At the test temperature of 100° F., it is estimated that a large portion of the thermal conductivity results from radiative heat transfer. Further incorporation of infrared opacification agents (i.e. carbon black) vastly improve the thermal performance of these materials.

Figure 1:
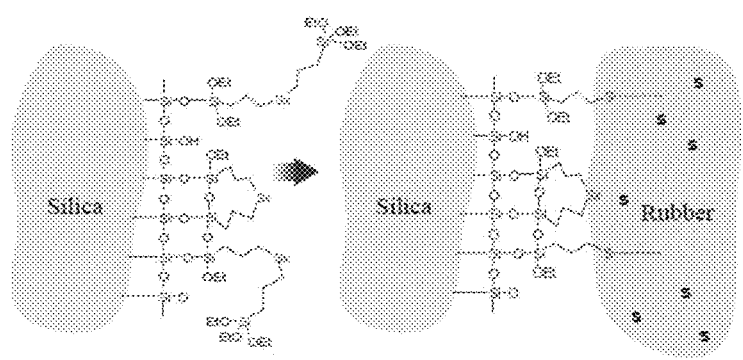
FIG. 1. Schematic depicting the use of coupling agents to improve the adhesion of rubber to silica FIG. 2. Schematic depicting the modification of poly(styrene-butadiene) latex with TESPT.
Figure 2:
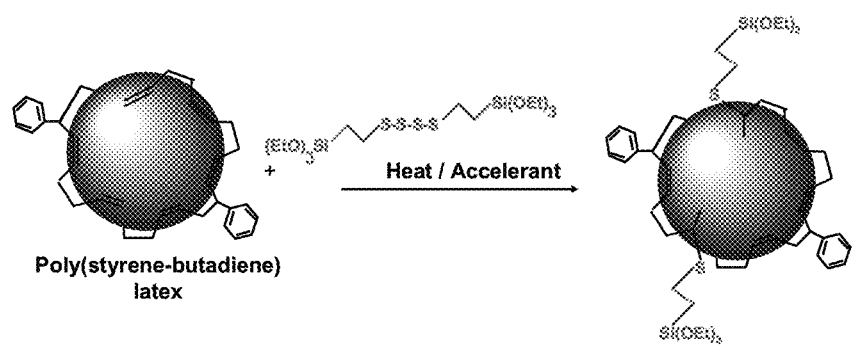
Figure 3:
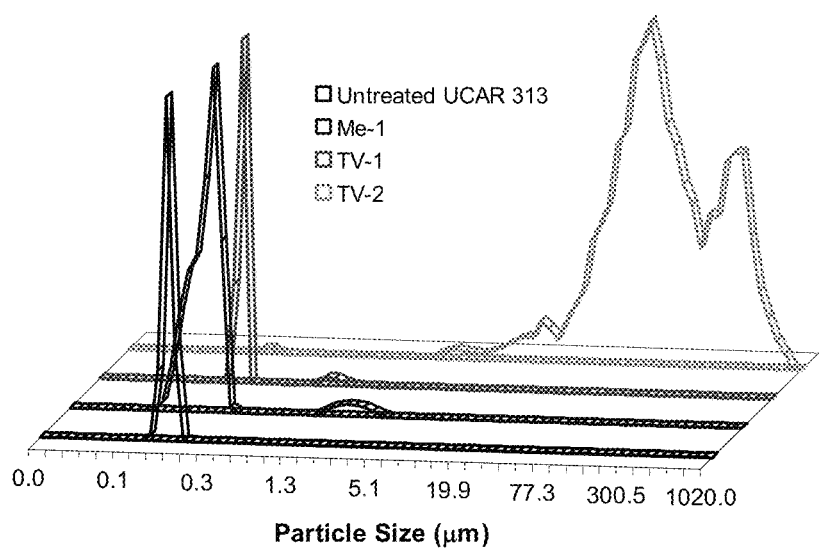
FIG. 3. Particle size distribution of treated and untreated UCAR 313 latex emulsions.
Figure 4:
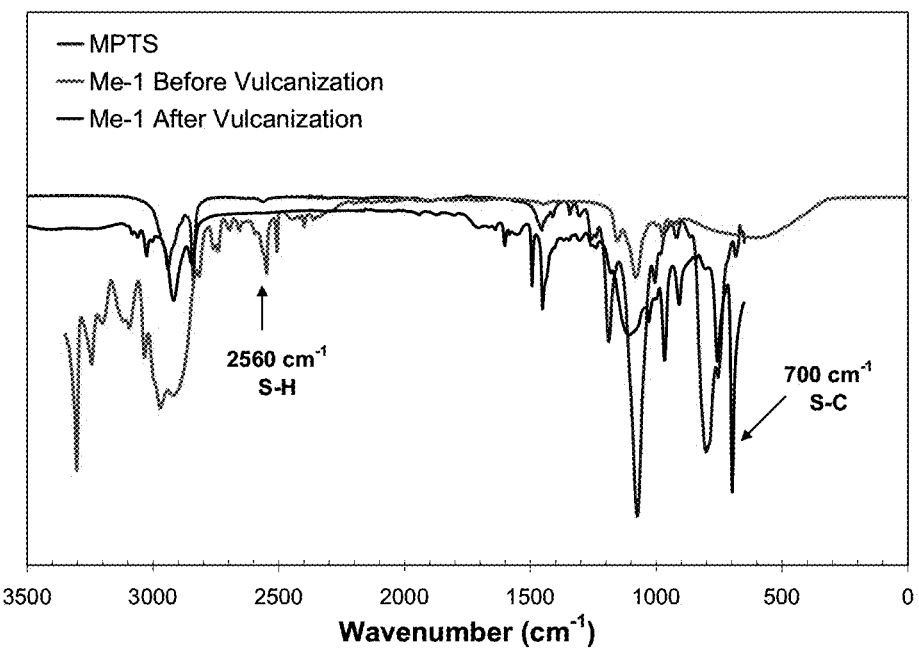
FIG. 4. FT-IR spectra of neat MPTS and a Me-1 latex emulsion before and after vulcanization.
Figure 5:
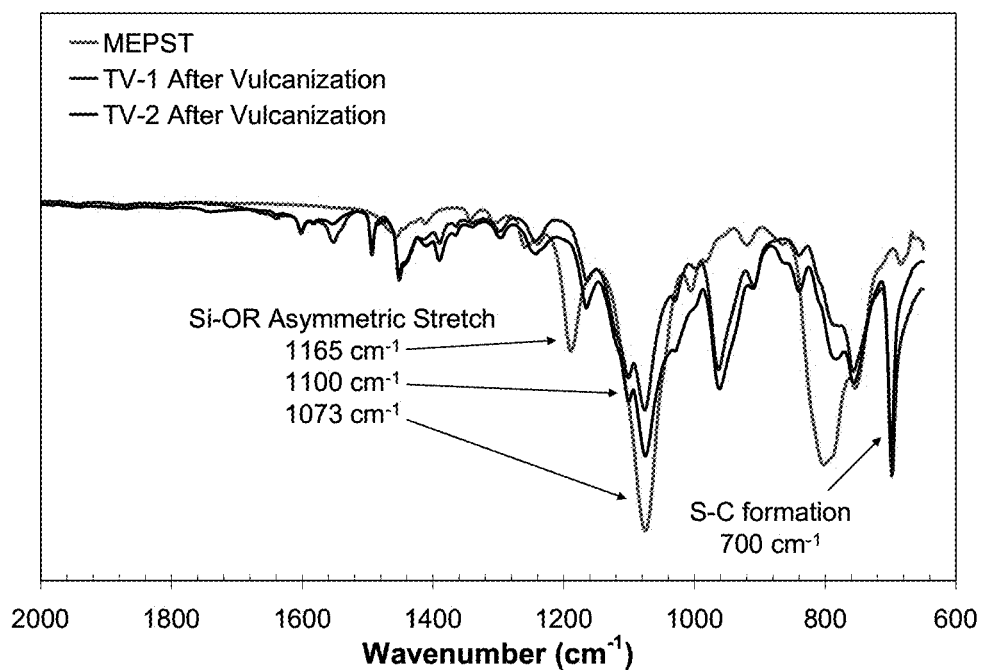
FIG. 5. FT-IR spectra of MEPST, vulcanized TV-1 latex and vulcanized TV-2 latex.
Figure 6:
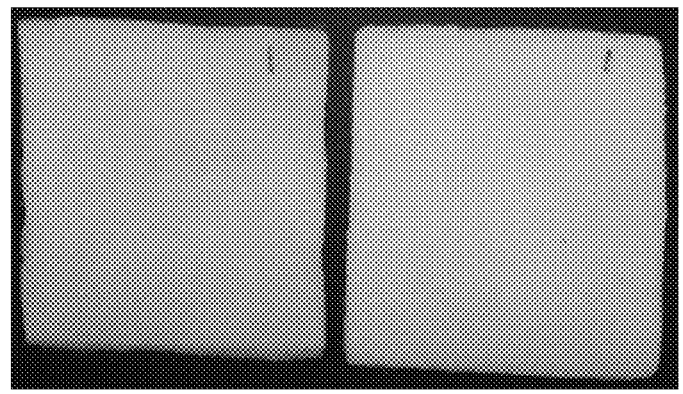
FIG. 6. Photographs of hybrid silica/SB rubber aerogels prepared with 50% TV-2 (left) and 30% TV-2 (right) latex emulsions.
Figure 7:
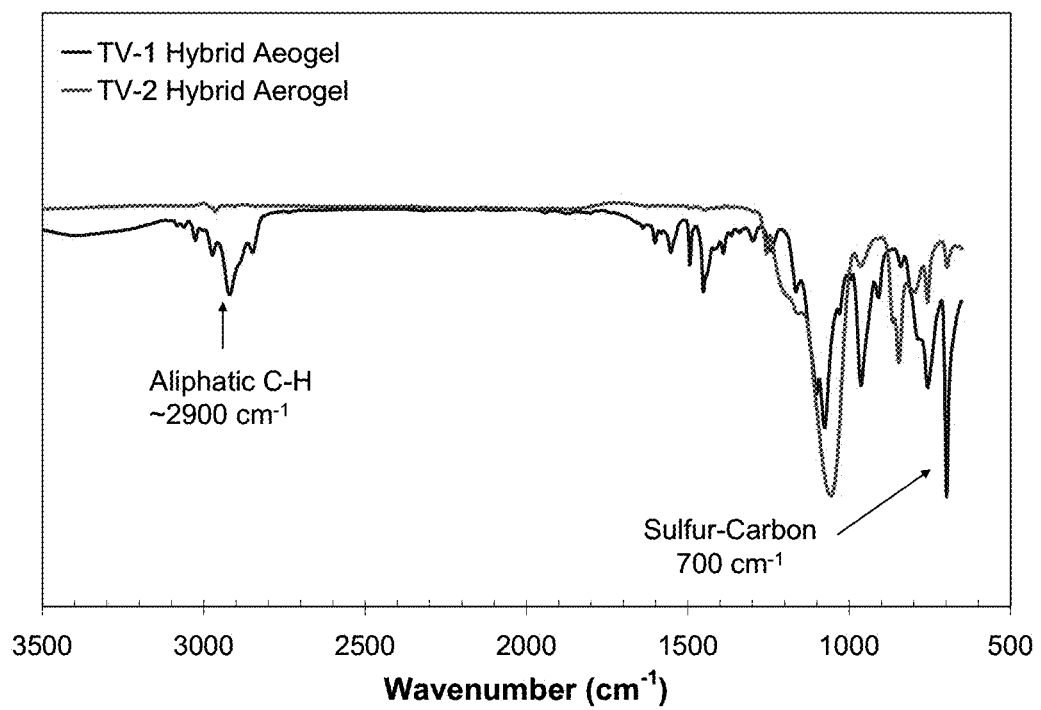
FIG. 7. FT-IR spectra of silica/SBR hybrid aerogels prepared using vulcanized latex TV-1 and TV-2.
Figure 8:
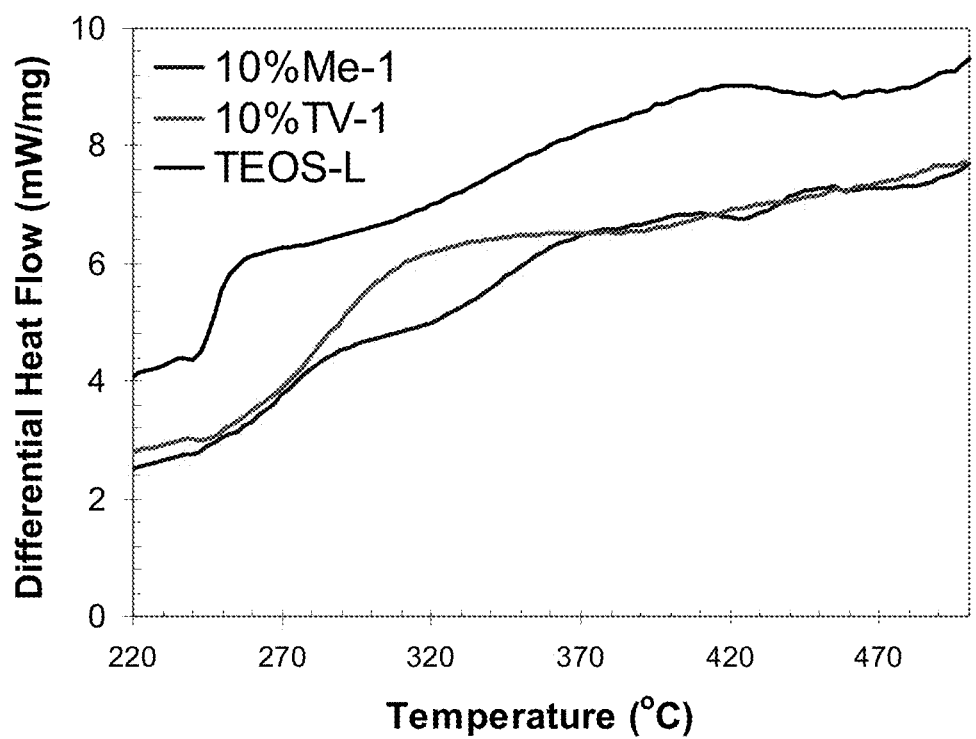
FIG. 8. DSC curves in air of latex/aerogel composites prepared at a 10% loading.
Figure 9:
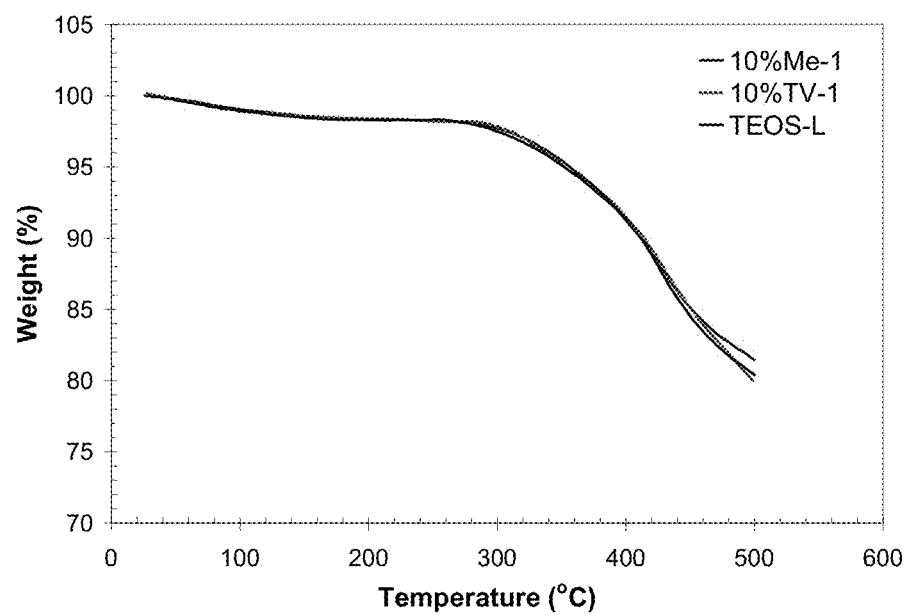
FIG. 9. TGA curves in air for latex/aerogel composites prepared at a 10% loading.
Figure 10:
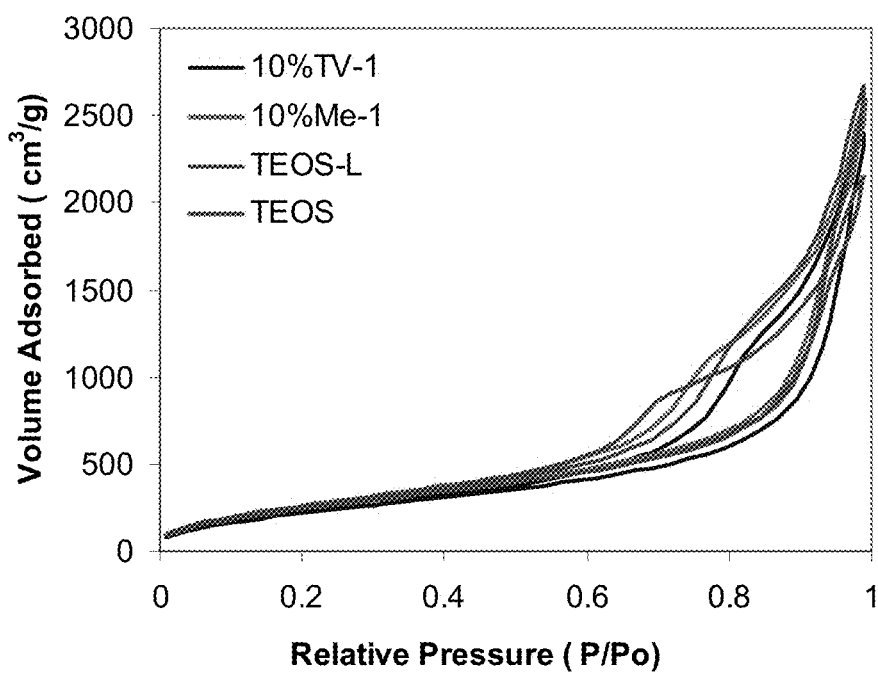
FIG. 10. Nitrogen physisorption isotherms for vulcanized latex/aerogel composites.
Figure 11:
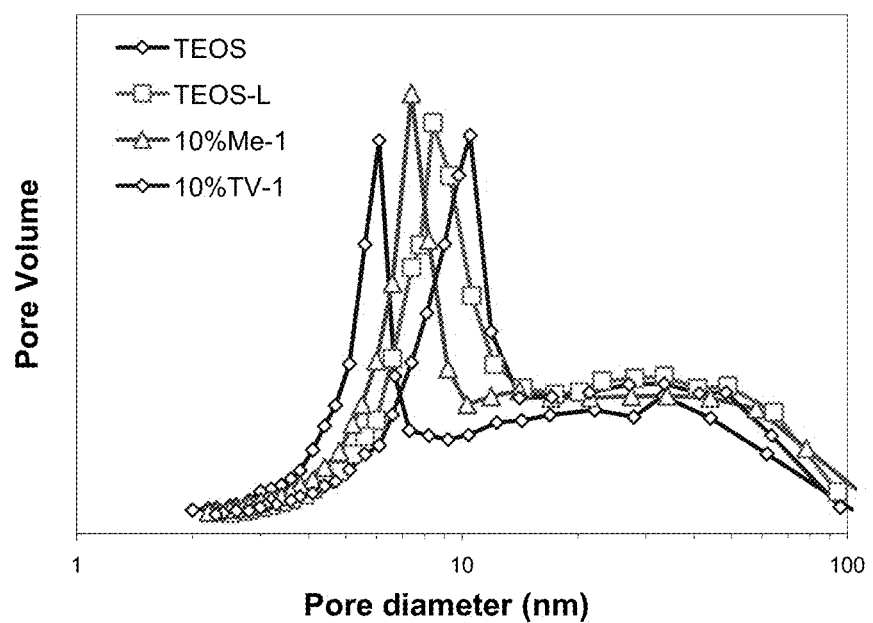
FIG. 11. Pore size distributions for vulcanized latex/aerogel composites.
Figure 12:
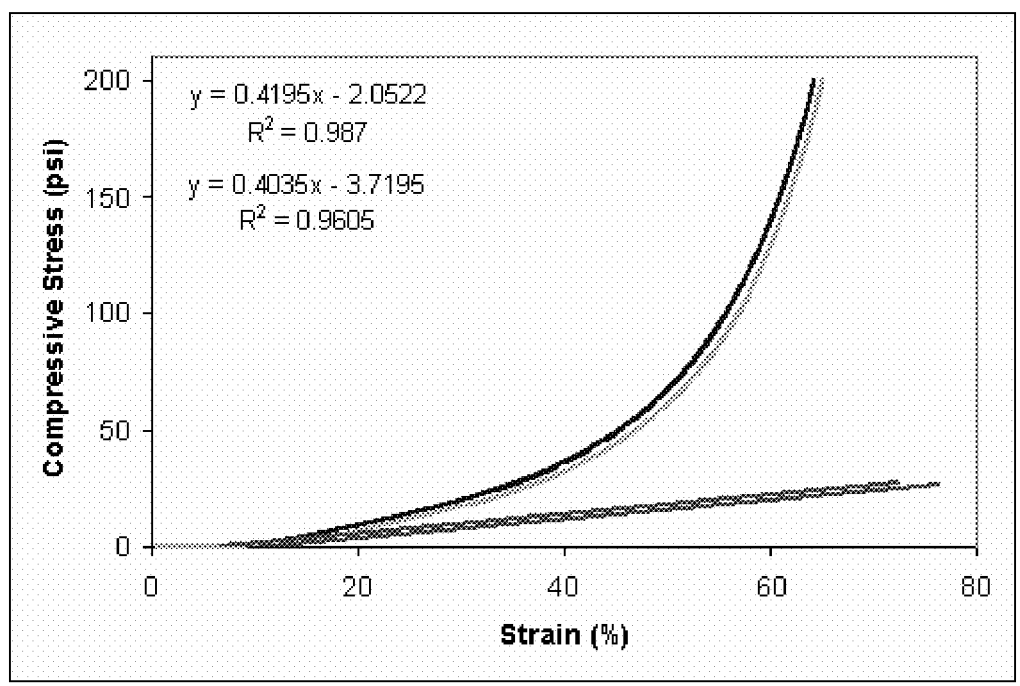
FIG. 12. Compressive stress strain curve of prototype aerogel composites prepared at a nominal target density of 0.05 g/cc.
Figure 13:
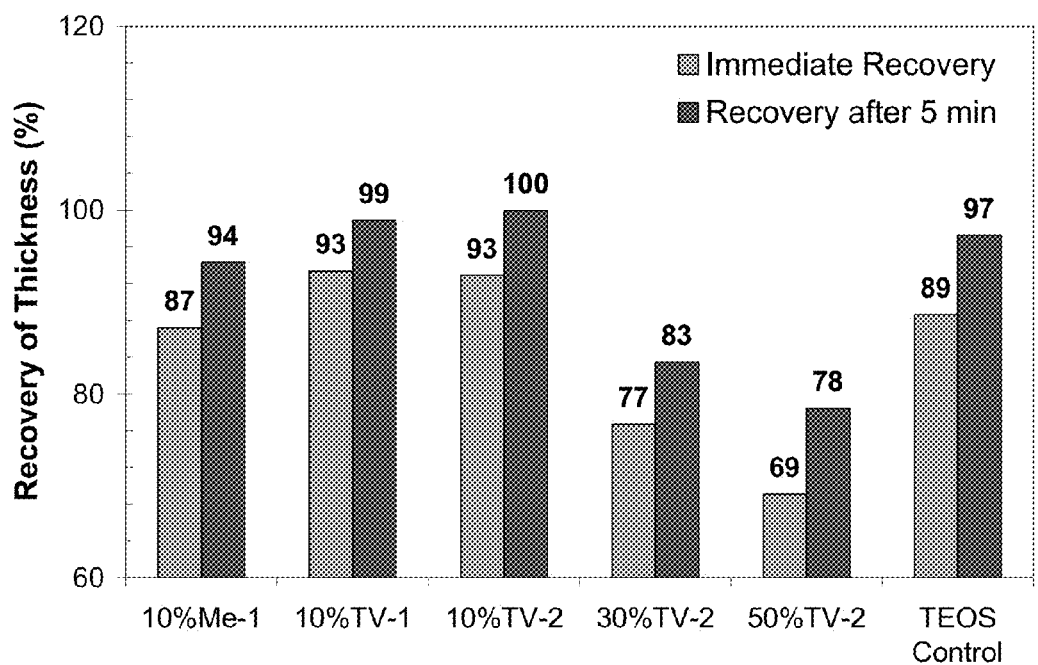
FIG. 13. Compressive recovery for hybrid aerogel composites prepared from the vulcanized SBR emulsions.
Figure 14:
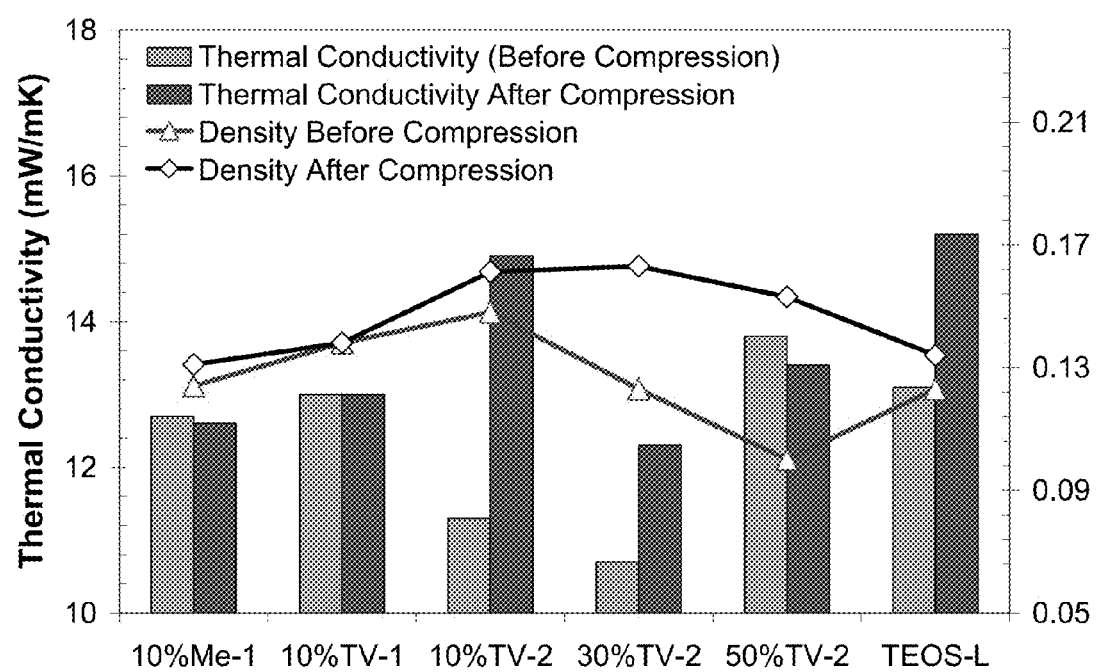
FIG. 14. Change in thermal conductivity and density for hybrid aerogel composites prepared with vulcanized SBR emulsions.
Figure 15:
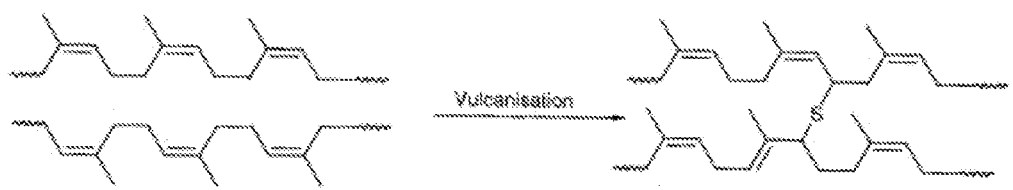
FIG. 15. Schematic depicting the vulcanization process.
Figure 16:
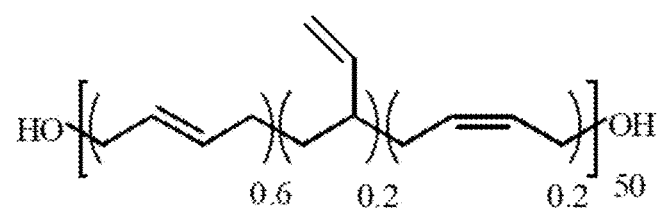
FIG. 16. Molecular structure of polybutadiene and TESPT. Chain length of PBD is longer than that shown in this figure.
Figure 16:
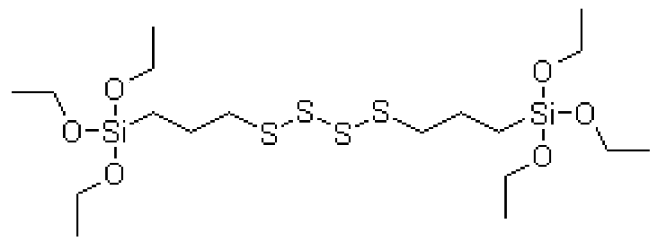
Figure 17:
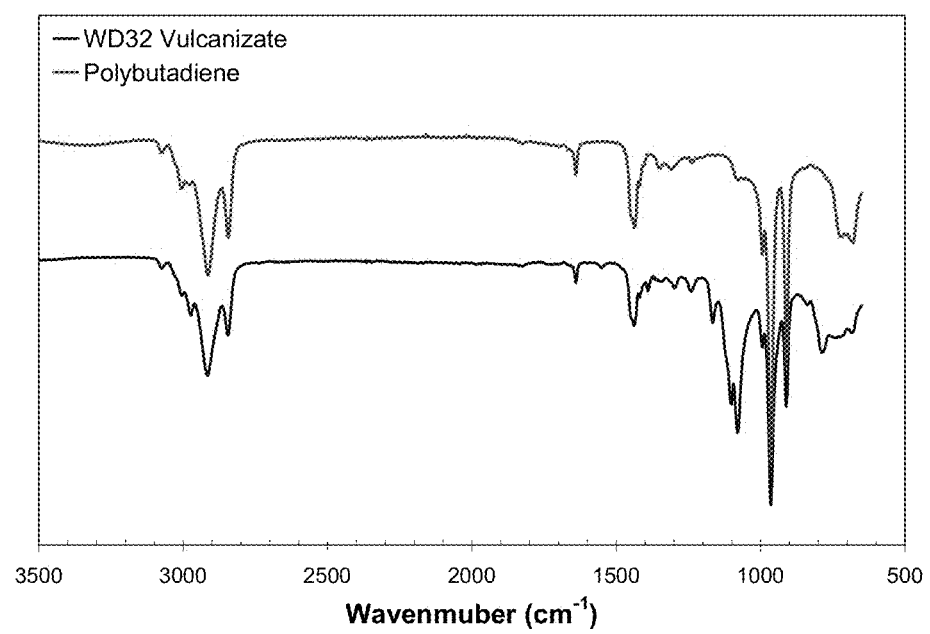
FIG. 17. FT-IR spectrum of WD-32 vulcanizate in comparison to pure polybutadiene.
Figure 18:
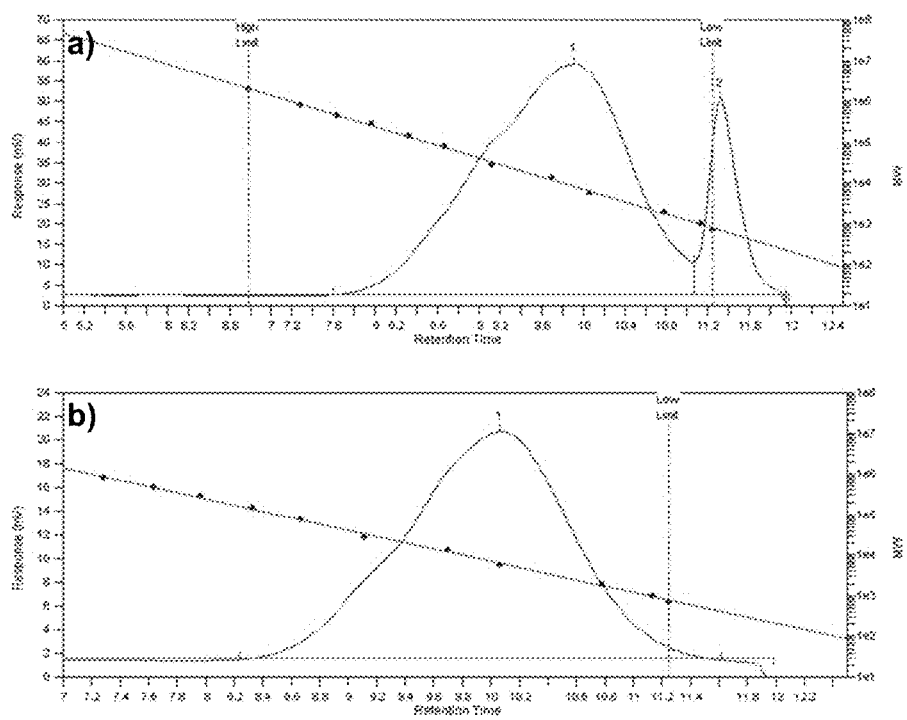
FIG. 18. GPC chromatograms of vulcanized polybutadiene prepared at a concentration of 0.65 g/cc and an olefin/TESPT molar ratio of 12.5 (a) in comparison to pure polybutadiene (b).
Figure 19:
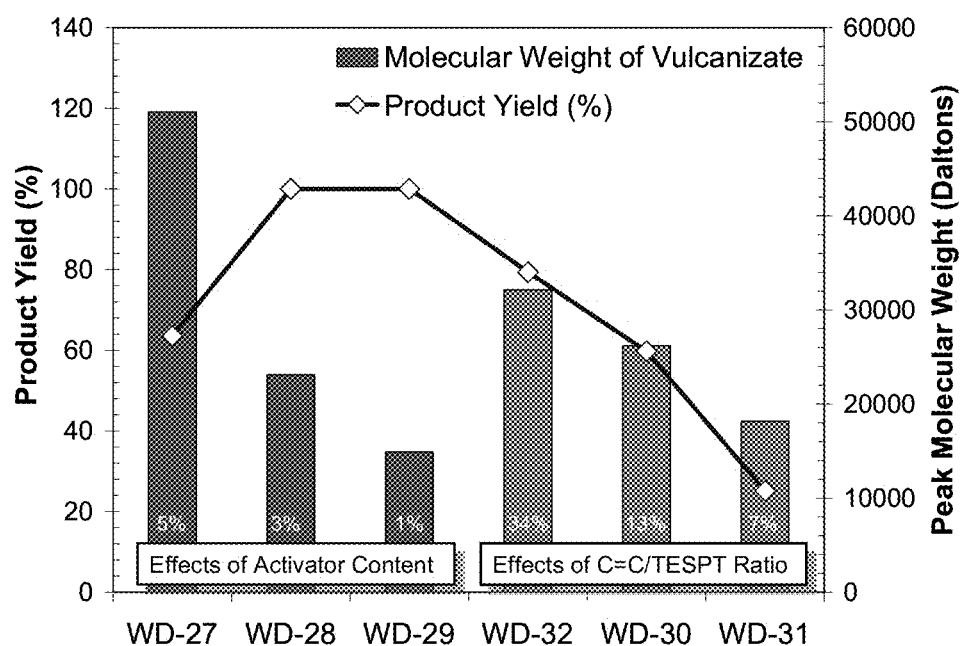
FIG. 19. Molecular weights and product yields determined for the vulcanization of PBD with TESPT according to GPC analysis.
Figure 20:
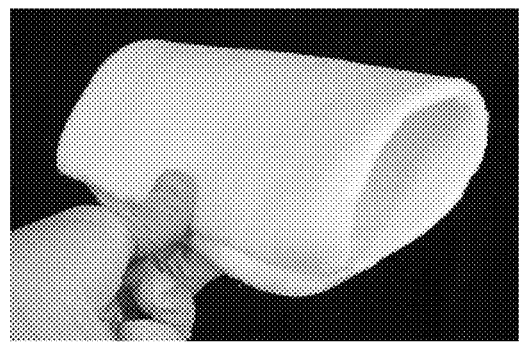
FIG. 20. Photographs of a fiber-reinforced hybrid rubber/silica aerogels exemplifying the highly flexible and resilient nature of this material.
Figure 21:
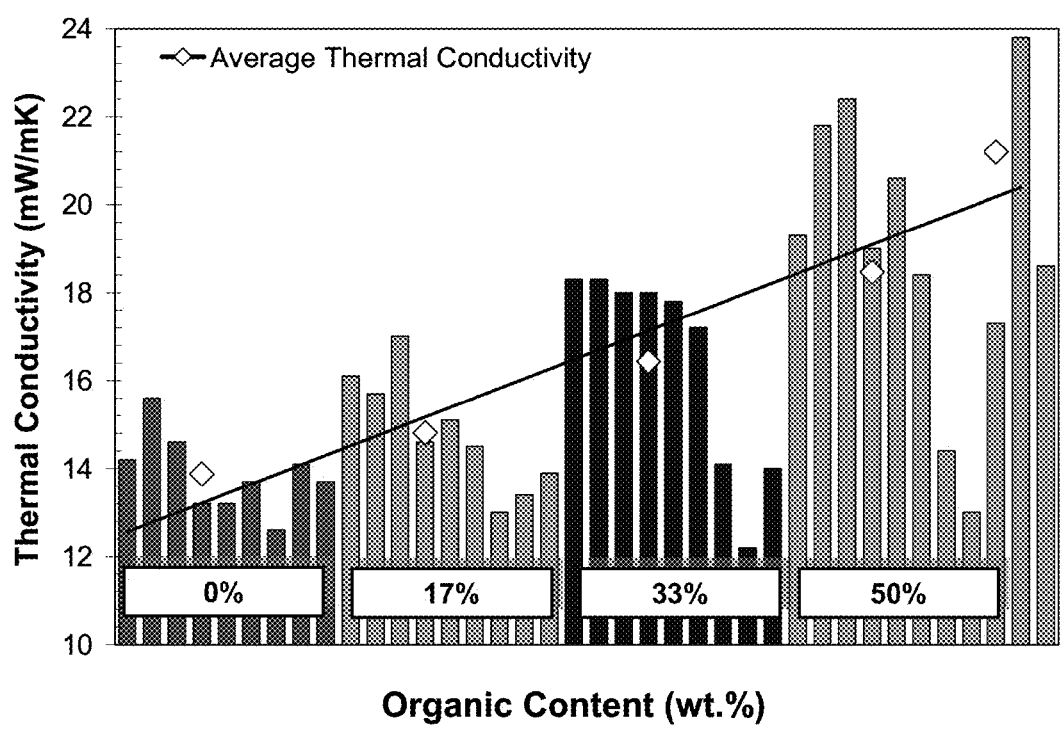
FIG. 21. Thermal conductivity values (1 atm, 100° F.) as a function of organic content for hybrid silica/PBD aerogels prepared with a variety of PBD vulcanizates.
Figure 22:
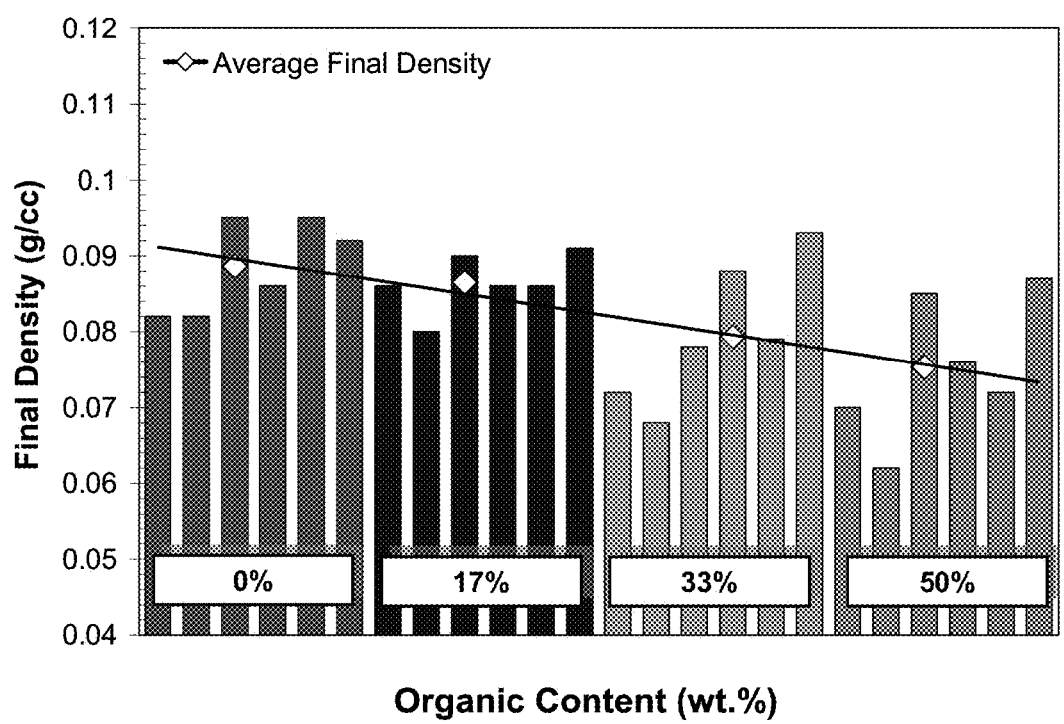
FIG. 22. Measured density values as a function of organic content for hybrid silica/PBD aerogels prepared with various PBD vulcanizates.
Figure 23:
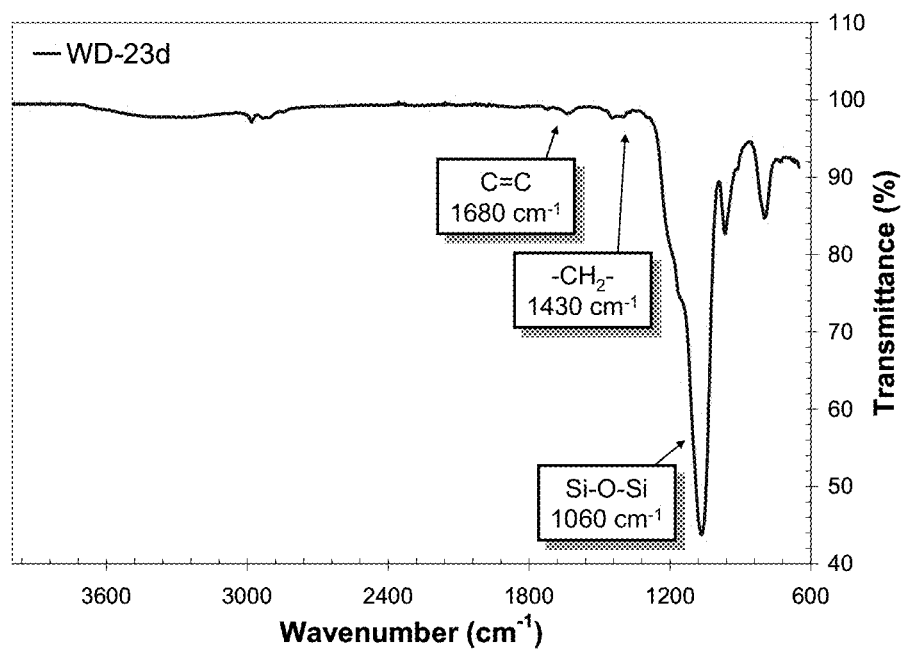
FIG. 23. FT-IR of a rubber/silica aerogel prepared with a low molecular weight vulcanizate (WD23).
Figure 24:
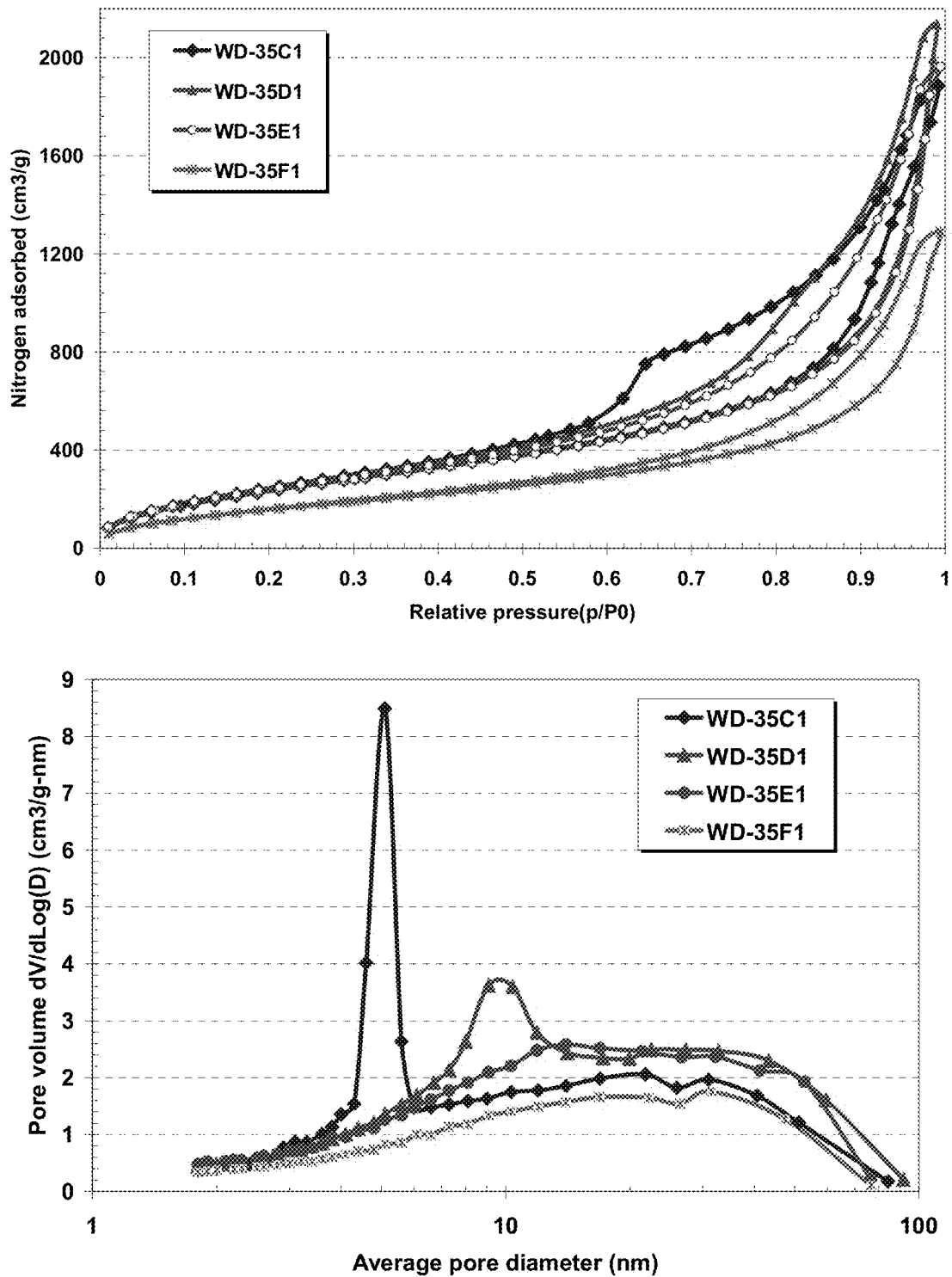
FIG. 24. Nitrogen isotherms (top panel) and pore size distribution of PBD-silica hybrid aerogels (bottom panel). PBD content in WD-35C1, D1, E1, and F1 are 0, 17, 33 and 50 wt %.
Figure 25:
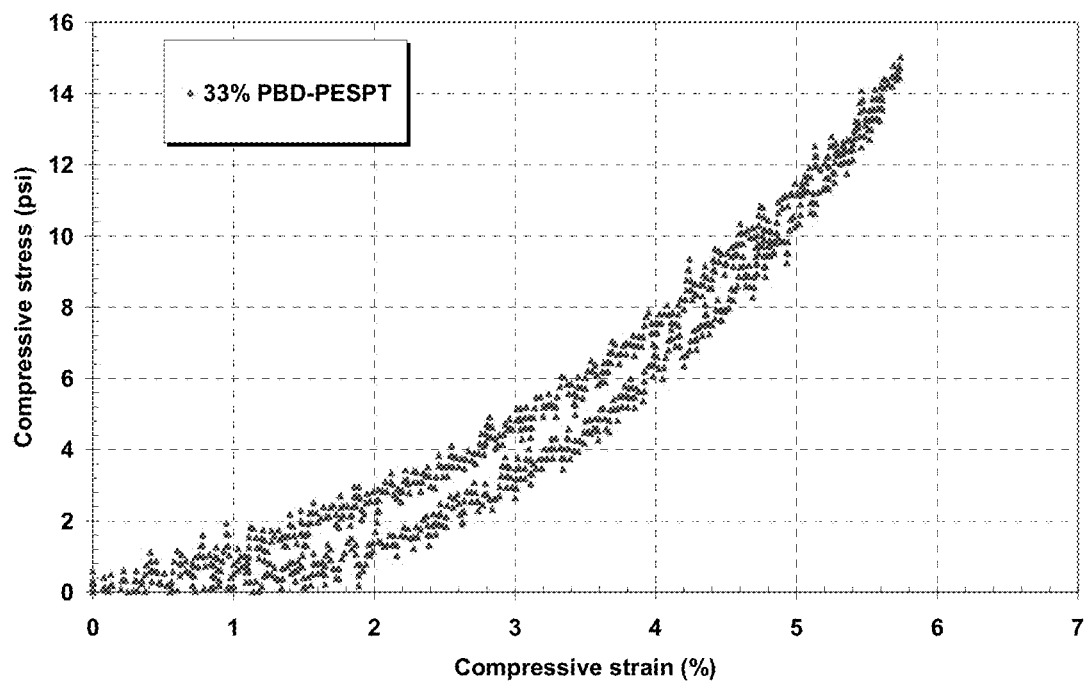
FIG. 25. Compressive stress-strain curve for Silica-BD/PESPT aerogel with 33% PBD-PESPT.
Figure 26:
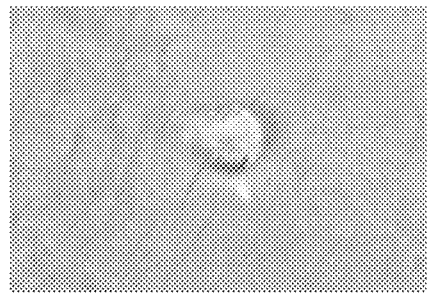
FIG. 26. Photograph displaying the inherent hydrophobicity of WD-23d.
Figure 27:
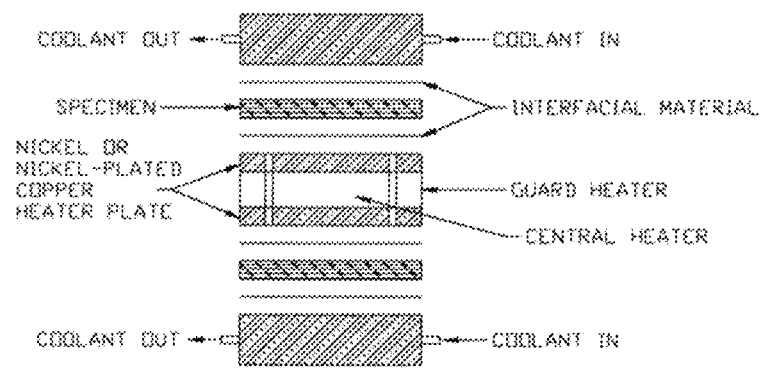
FIG. 27. Schematic depicting a typical ASTM C177 guarded hot plate apparatus.
Figure 28:
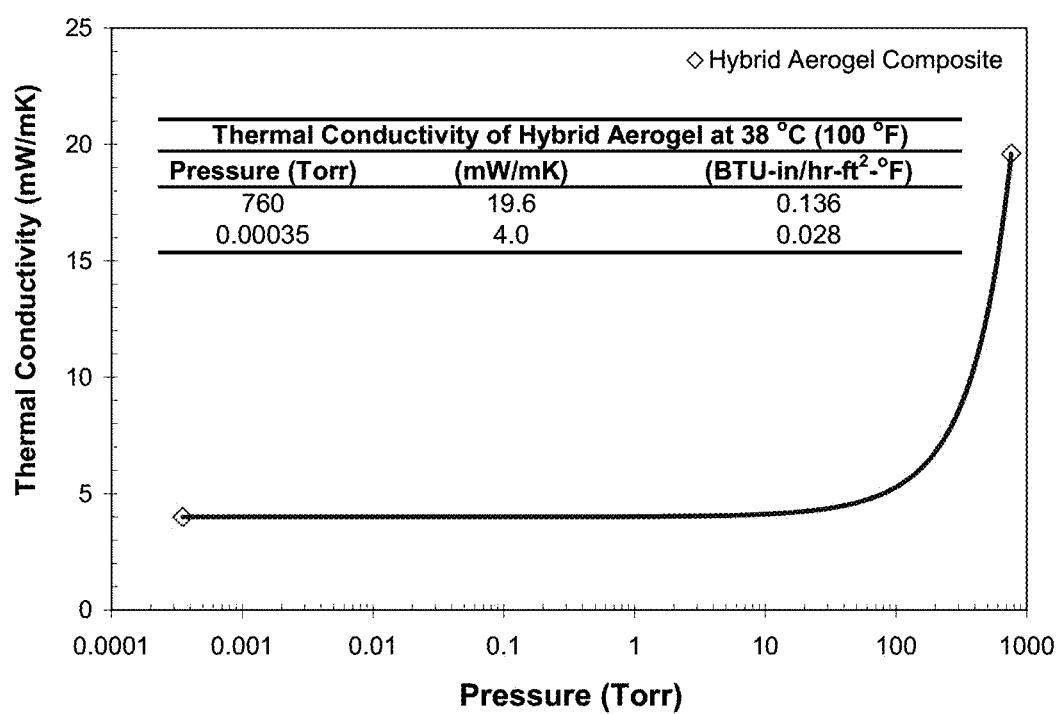
FIG. 28. Thermal conductivity (ASTM C177) of a hybrid aerogel composite as a function of atmospheric pressure at 38° C. (100° F.).

The invention claimed is:

1. A gel comprising a silica network and an organic polymer within the silica network, wherein the organic polymer is covalently bound to the silica network through a sulfur containing cross linking agent.

2. The gel of claim 1 wherein the gel is in aerogel form.

3. The gel of claim 1 or claim 2, wherein the organic polymer is selected from the group consisting of unsaturated polyesters; prepolymers based on vinylesters, acrylates, methacrylates, polyurethanes; polybutadienes; polystyrenes; polyisoprene co-polymers; styrene-butadiene copolymers; butadiene-isoprene co-polymers; butadiene-isoprene-styrene terpolymers; copolymers and terpolymers of isobutylene, para-methyl styrene and bromo-para-methyl-styrene; ethylene propylene diene monomer rubbery and a combination thereof.

4. The gel of claim 1 or 2 wherein the organic polymer is in the form of latex particles or a polymer resin.

5. The gel of claim 1 or claim 2, wherein the sulfur-containing cross linking agent is a hexasulfide compound, a tetrasulfide compound, or a disulfide compound.

6. The gel of claim 1 or claim 2, wherein the sulfur-containing cross linking agent is selected from the group consisting of polysulfide alkyl silanes, mercapto aryl silanes, polysulfide aryl silanes, silated core polysulfides, sulfur-containing silanes, sufanylsilanes, sulfur-containing siloxanes, sulfur-functional polyorganosiloxanes, and any combination thereof.

7. The gel of claim 1 or claim 2, wherein the sulfur-containing cross linking agent is a sulfidosilane of a general formula $(R_1—O)_3—Si—R_2—S_x—R_2—Si—(R_1—O)_3$ or of a general formula $HS—R_1—Si—(O—R_2)_3$ where $R_1$ and $R_2$ are same or different alkyl or aryl groups; x is a number between 1 and 8.

8. The gel of claim 1 wherein the organic polymer in the gel is present in an amount up to 50 weight %.

9. The gel of claim 1 wherein the sulfur-containing cross linking agent in the gel is present in an amount up to 50 weight %.

10. The gel of claim 1 wherein the amount of organic polymer in the gel is at least 3 weight %.

11. The gel of claim 1 or claim 2, further comprising fibers in an amount up to 75 weight % of the gel.

* * * * *